United States Patent [19]
Vande Haar

[11] Patent Number: 5,924,312
[45] Date of Patent: Jul. 20, 1999

[54] MULTIPLE DIRECTION VIBRATION ABSORBER

[75] Inventor: Evan R. Vande Haar, Newton, Iowa

[73] Assignee: Maytag Corporation, Newton, Iowa

[21] Appl. No.: 08/996,755

[22] Filed: Dec. 23, 1997

[51] Int. Cl.$^6$ .................................................. D06F 37/20
[52] U.S. Cl. ........................ 68/23.2; 74/573 R; 74/574; 188/380
[58] Field of Search .............................. 68/23.2; 494/82; 210/363, 364, 365; 188/380; 74/573 R, 574

[56] References Cited

U.S. PATENT DOCUMENTS

| | | | |
|---|---|---|---|
| 373,577 | 11/1887 | Barrie | 210/365 X |
| 989,958 | 4/1911 | Frahm | 188/380 |
| 2,408,509 | 10/1946 | Clark | 188/380 X |
| 2,484,241 | 10/1949 | Mulheim | 171/209 |
| 3,125,888 | 3/1964 | Fox | 74/98 |
| 3,167,508 | 1/1965 | Gruner | 210/250 |
| 3,236,334 | 2/1966 | Wallerstein, Jr. | 188/1 |
| 3,262,661 | 7/1966 | Johnson et al. | 248/18 |
| 3,270,222 | 8/1966 | Shaffer | 310/51 |
| 3,295,541 | 1/1967 | Ummel | 134/182 |
| 3,395,296 | 7/1968 | Cohen | 310/51 |
| 3,425,651 | 2/1969 | Jenkins | 248/18 |
| 3,587,343 | 6/1971 | Mahncke | 74/603 |
| 3,797,327 | 3/1974 | Voorhees et al. | 74/604 |
| 3,826,340 | 7/1974 | Brokaw | 188/1 B |
| 4,044,628 | 8/1977 | Jacks | 74/574 |
| 4,150,588 | 4/1979 | Brewer | 74/574 |
| 4,289,449 | 9/1981 | Frister | 416/185 |
| 4,617,484 | 10/1986 | Buijsen | 310/51 |
| 4,819,503 | 4/1989 | Fazi, Jr. et al. | 74/574 |
| 4,938,325 | 7/1990 | Nakagawa | 188/378 |
| 4,973,868 | 11/1990 | Wust | 310/51 |
| 5,057,726 | 10/1991 | Mole et al. | 310/67 R |
| 5,095,793 | 3/1992 | Button | 83/628 |
| 5,188,002 | 2/1993 | Wolf et al. | 74/574 |
| 5,205,190 | 4/1993 | Kohring | 74/574 |
| 5,310,137 | 5/1994 | Yoerkie, Jr. et al. | 244/17.27 |
| 5,373,922 | 12/1994 | Marra | 188/379 |
| 5,775,472 | 7/1998 | Osterberg et al. | 188/380 X |

OTHER PUBLICATIONS

Dan Davis, "Beauty In The Eye Of The Builder" (Appliance), Apr. 1995, pp. 65–69, Houston, Texas.

Appliance Manufacturer, "Lock in the Quiet!", Mar. 1995, p.. 32 and two additional unnumbered pages.

*Primary Examiner*—Philip R. Cole
*Attorney, Agent, or Firm*—Zarley, McKee, Thomte, Voorhees & Sease

[57] ABSTRACT

A tuned vibration absorber mounted to the enclosure of a machine. The vibration absorber is suspended to absorb the vibration created by the dynamic system of the machine. The vibration absorber includes a mass and a plurality of springs used to suspend the mass in a desired location.

14 Claims, 1 Drawing Sheet

MULTIPLE DIRECTION VIBRATION ABSORBER

BACKGROUND OF THE INVENTION

The present invention relates to laundry appliances, particularly clothes dryers and clothes washing machines. More particularly, the present invention relates to a device for reducing the machine vibration of such appliances.

Laundry appliances have an inherent problem in that their dynamic systems rotate at high speeds, often producing excessive machine vibration. The dynamic system of the machine produces vibration which is transferred to the enclosure. This machine vibration typically becomes more problematic as the dynamic system increases rotational speed. For example, an unbalanced, rotating tub of a washing machine transfers the most vibration to the enclosure during the spin cycle.

Prior art tubs and spinners have been designed to "float" on suspension systems. This allows some vibration to be absorbed before it reaches the enclosure; however, more is needed to reduce the vibration that reaches the enclosure. This vibration can damage not only the laundry appliance, but also the floor or other supporting surface. Further, a vibrating enclosure is both noisy and distracting to the user. Thus, there is a need in the art for a device that will minimize the amount of vibration in laundry appliances.

A general object of the present invention is the provision of an improved washing machine or other laundry appliance.

A further object of the present invention is the provision of a device for reducing or minimizing the vibration of a laundry appliance.

A still further object of the present invention is the provision of a device for reducing machine vibration when the machine is operated over a certain range of speeds.

A further object of the present invention is the provision of a device for reducing machine vibration which is efficient in operation, economical to manufacture, and durable in use.

SUMMARY OF THE INVENTION

The foregoing objectives are achieved in a preferred embodiment of the invention by a tuned vibration absorber mounted to the enclosure or enclosure of the machine. The tuned vibration absorber is suspended to absorb the vibration from the dynamic system of the machine. This reduces vibration of the enclosure. The vibration absorber includes a mass and a spring system for suspending the mass from the enclosure of the machine. The vibration absorber is tuned to vibrate out of phase with machine vibration when the machine is operated at a specific speed, typically the maximum or optimal rotational speed, thereby reducing enclosure and floor vibration.

The vibration absorber can be tuned to vibrate in three directions. Vibration frequencies can be matched in all three directions along a three-dimensional axis by providing a multiple spring system symmetrical in one plane with a mass of sufficient size and weight and springs of sufficient rate and tension to match the vibration frequency in the third direction. Alternatively, a three-dimensional spring system can be used to match frequencies. Multiple vibration absorbers may also be provided to reduce vibration at several different rotational speeds.

DETAILED DESCRIPTION OF THE DRAWINGS

The present invention will be described as it applies to a preferred embodiment. It is not intended that the present invention be limited to the described embodiment. It is intended that the invention cover all alternatives, modifications, and equivalents within the spirit and scope of the invention.

Figure 1:
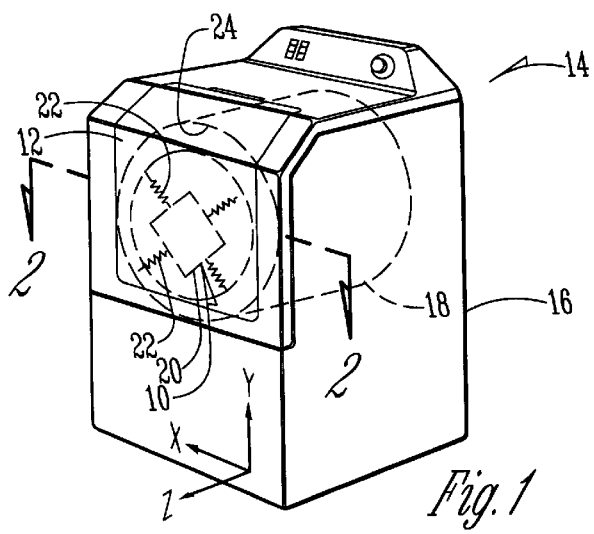
FIG. 1 is a perspective view of a tuned vibration absorber of the present invention mounted to the enclosure of a horizontal axis clothes washing machine.

With continuing reference to the drawings, the tuned vibration absorber of the present invention is generally referred to by reference numeral 10. FIG. 1 shows the vibration absorber 10 mounted within the door 12 of a horizontal axis clothes washing machine 14 having an enclosure 16 and a tub 18.

The tuned vibration absorber 10 includes a mass 20 and a plurality of springs 22 that are used to suspend the mass in a desired location. The springs 22 may be fixed in any conventional way to the door 12. The springs 22 are of sufficient rate and tension such that the mass 20 is allowed to vibrate in response to the machine vibration.

In a washing machine, most of the machine vibration is the result of an unbalanced rotating tub. Although the vibration absorber 10 may be mounted in a variety of different positions to effectively reduce vibration, mounting the vibration absorber within the door 12 along the axis of the tub 18 adjacent the tub opening 24 has been found effective.

The vibration absorber 10 is tuned to reduce machine vibration when the tub 16 is rotated at top speed. At a speed slightly lower than the optimal speed, amplification of vibration occurs over a small speed range. Thus, it is recommended that the controls of the machine should monitor the machine speed and accelerate quickly through the amplified speed range or should reduce the speed to an acceptable level of vibration.

Figure 2:
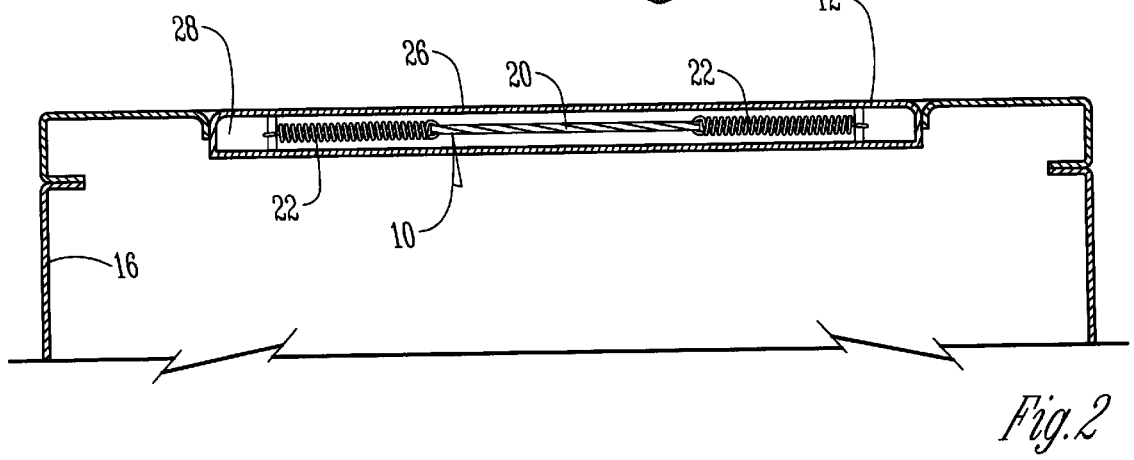
FIG. 2 is a sectional view taken along line 2—2 of FIG. 1.

As shown in FIG. 2, the vibration absorber is mounted such that the mass 20 is substantially parallel to the outside wall 26 of the door 12. The mass 20 can be shaped in a variety of different configurations. In its preferred form, however, the mass 20 is a metal plate. Additional weight may be attached towards the center of the metal plate to fine tune the vibration absorber 10 for a particular machine speed.

Figure 3:
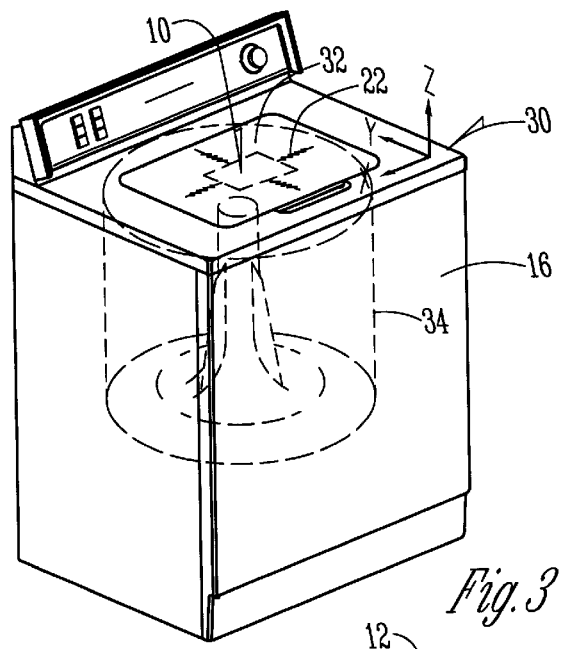
FIG. 3 is a perspective view of the tuned vibration absorber mounted to a vertical axis clothes washing machine.

The vibration absorber 10 is symmetrical, and the springs 22 are aligned in substantially the same plane. A particular vibration absorber 10 is selected or "tuned" for a particular application. The natural frequency of the vibration absorber 10 is matched to the vibration frequency of the machine in both the x and y axis of the plane as shown in FIGS. 1 and 3. A mass is selected having a sufficient weight, or in the alternative additional weights are added to the metal plate, and then spring rate and load are selected to tune the frequency in the direction of the third z axis, as well. Alternatively, a three dimensional spring system (not shown) can also be used to match frequencies in all three directions.

Multiple vibration absorbers 10 can also be mounted to the enclosure to provide vibration reduction at several different speeds. For example, the cavity 28 of the door 12 of the washing machine 14 provides space for multiple absorbers.

It should be understood that this invention is not limited to horizontal axis washing machines. As shown in FIG. 3, the vibration absorber 10 of the present invention can also be used with vertical axis washing machines 30. Here, the vibration absorber is most effective when mounted proximate the upper door 32 of the washer adjacent the vertical axis of the tub 34.

In use, the vibration absorber 10 vibrates out of phase from the vibration created by the dynamic system to reduce the vibration transferred to the enclosure 16. The vibration absorber 10 eliminates or absorbs the vibrations created by the tub 18, 34 before they reach the enclosure 16.

It can therefore be seen that the invention accomplishes at least all of its stated objectives.

What is claimed is:

1. A tuned vibration absorber to reduce vibrations of a machine having a rotatable member mounted in an enclosure, said vibration absorber comprising:

a mass;

a spring system suspending the mass from the enclosure; and the mass and the spring system being tuned to vibrate out of phase with machine vibration during rotation of the member, thereby reducing machine vibration.

2. The vibration absorber of claim 1 wherein the spring system includes a plurality of springs for connecting the mass to the enclosure.

3. The vibration absorber of claim 2 wherein the springs are disposed in a common plane.

4. The vibration absorber of claim 3 wherein the mass and spring system vibrate orthogonally to the common plane for reducing the machine vibration.

5. The vibration absorber of claim 4 wherein the mass includes a plate member.

6. A vibration absorber for use in a washing machine having a tub disposed about a rotational axis within an enclosure, the vibration absorber having the advantage of reducing machine vibration when the machine is operated at an optimal speed, the vibration absorber comprising:

a mass; and a spring system fixed to the enclosure and suspending the mass generally along the rotational axis adjacent the tub;

the mass and the spring system being tuned to vibrate out of phase with machine vibration at the optimal speed, thereby reducing machine vibration.

7. The vibration absorber of claim 6 wherein the washing machine includes an access door, the vibration absorber being mounted within the access door.

8. The vibration absorber of claim 6 wherein the washing machine has an access door in the enclosure adjacent the tub, the mass being suspended to or within the door.

9. The vibration absorber of claim 8 wherein the spring system includes a plurality of springs, each of the springs connecting the mass to the door.

10. The vibration absorber of claim 9 wherein the springs are disposed in a common plane parallel to the door.

11. The vibration absorber of claim 10 wherein the mass has sufficient size and weight to vibrate orthogonally to the common plane for reducing the machine vibration at the optimal speed.

12. The vibration absorber of claim 11 wherein the mass is allowed to vibrate both along the common plane and orthogonal to the common plane.

13. An improved substantial horizontal axis washing machine having a tub disposed about a horizontal axis within an enclosure, and a door in the enclosure adjacent the tub, wherein the improvement comprises:

a vibration absorber having a mass and a plurality of springs operatively connecting the mass to the enclosure for suspending the mass;

the vibration absorber disposed about the door and generally along the horizontal axis, and the vibration absorber being tuned to vibrate out of phase with the tub to reduce machine vibration.

14. The washing machine of claim 13 wherein the vibration absorber is tuned to vibrate both along and perpendicular to the horizontal axis.

* * * * *